H. BURTON.
Bee Hive.
No. 81,747.
Patented Sept. 1, 1868.
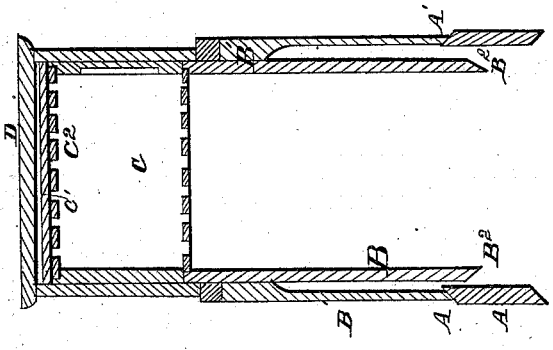
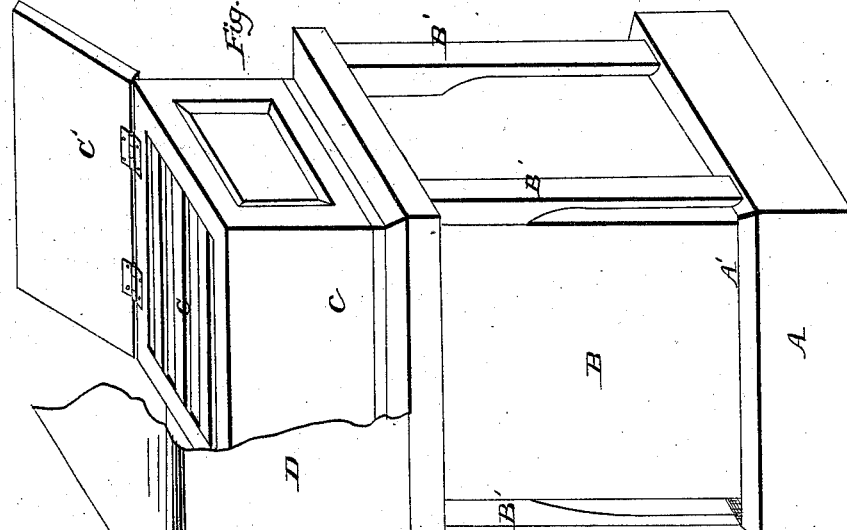

United States Patent Office.

HENRY BURTON, OF RICHVIEW, ILLINOIS.

Letters Patent No. 81,747, dated September 1, 1868.

IMPROVEMENT IN BEE-HIVES.

*The Schedule referred to in these Letters Patent and making part of the same.*

TO ALL WHOM IT MAY CONCERN:

Be it known that I, HENRY BURTON, of Richview, in the county of Washington, and State of Illinois, have invented an Improvement in Bee-Hives; and I do hereby declare that the following is a full, clear, and exact description of the same, reference being had to the annexed drawings, making part of this specification, in which—

Figure 1 is a perspective view, and
Figure 2 is a vertical section.
The same letters in all the figures indicate the same parts.

This improvement in bee-hives is intended to prevent the entrance of larvæ and other creeping worms into the body of the hive, and consists in the mode of suspending the hive in relation to the base.

A is the base of the hive, which is intended to stand upon a bench. The base conforms to the shape of the hive B, and is bevelled on the upper edge, as shown in the drawings, to form a sharp edge on the inner side. B is the body of the hive; it is about an inch less in diameter from outside to outside than the base, measured from inside to inside, so that a space of about half an inch in width may be left all around the body of the hive, between it and the base. The lower edge of the hive is bevelled downwards, from outside to inside, so as to terminate in a sharp edge in the bottom at $B^2$, as shown, so that, as the boards are about one inch in thickness, the space between the lower edge of the hive and the base will be about an inch and a half. The hive B does not rest on the bench, but is raised, say, an inch and a half above it, and it is supported upon the legs $B^1$, formed as shown, attached to the outside of the hive, and cut away below the point of attachment, and resting upon the top of the base, about half way down the slope of the bevelled edge.

Worms or other creeping things climbing the base, even if they pass down the inside, cannot ascend into the hive, while the bees, passing through the open space between the hive and the base, can fly up into the hive.

C is the honey-box, having a glass plate in one side, and a hinged cover, $C^1$, shutting down over the slats $C^2$, placed in the top of the box. This box is covered by a close cover, D, which shuts over the box C, resting on the hive B.

What I claim as my invention, and desire to secure by Letters Patent, is—

The hive B, suspended within, but not in contact with, the base, A, upon legs $B^1$, which support it above the bench, said parts being respectively constructed and arranged in relation to one another substantially as and for the purpose set forth.

In testimony whereof, I have signed my name to this specification in the presence of two subscribing witnesses.

HENRY BURTON.

Witnesses:
HENRY SWAN,
WILLIAM X EARLS.
      his mark.